United States Patent Office 3,364,719
Patented Jan. 23, 1968

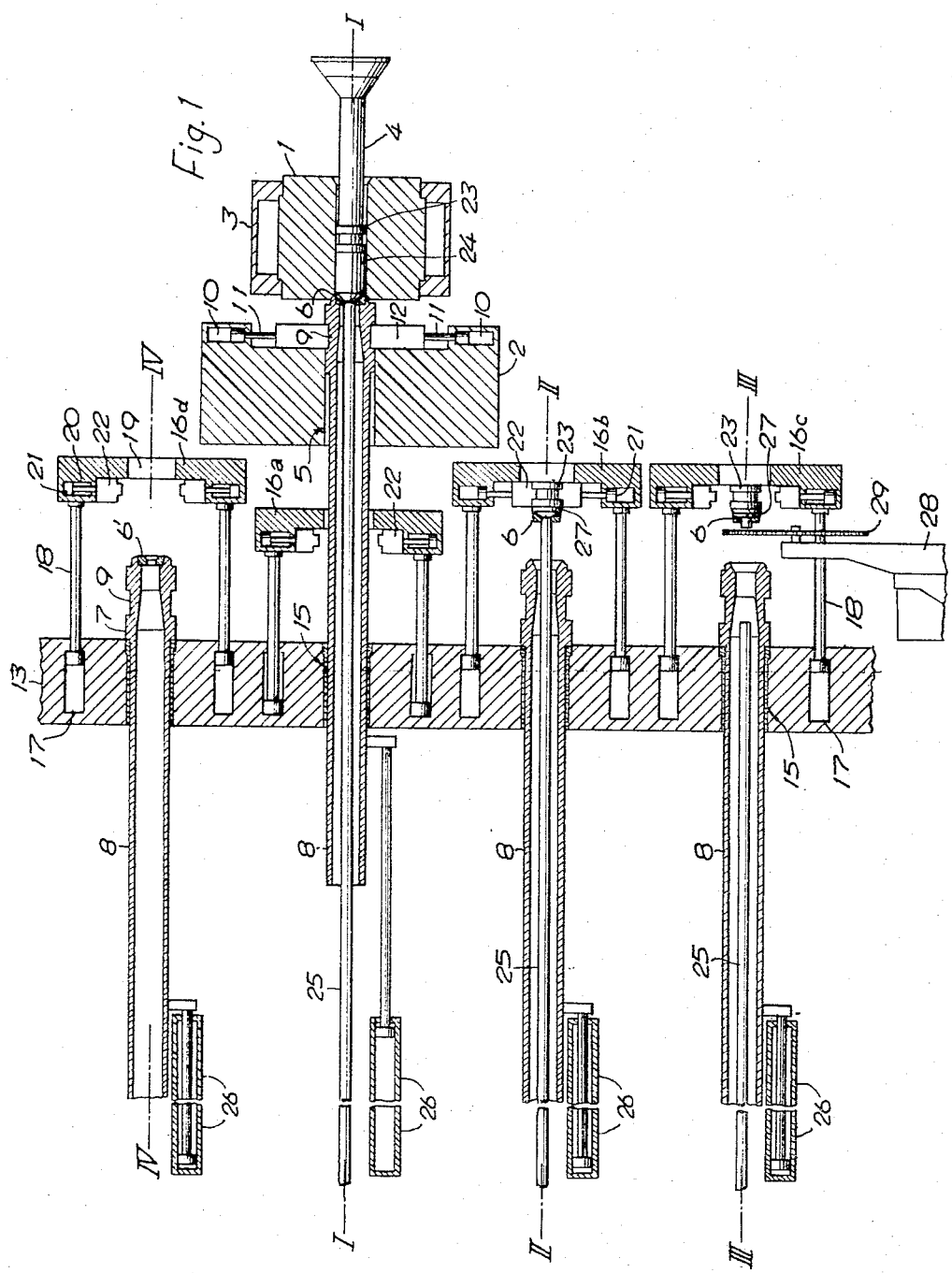

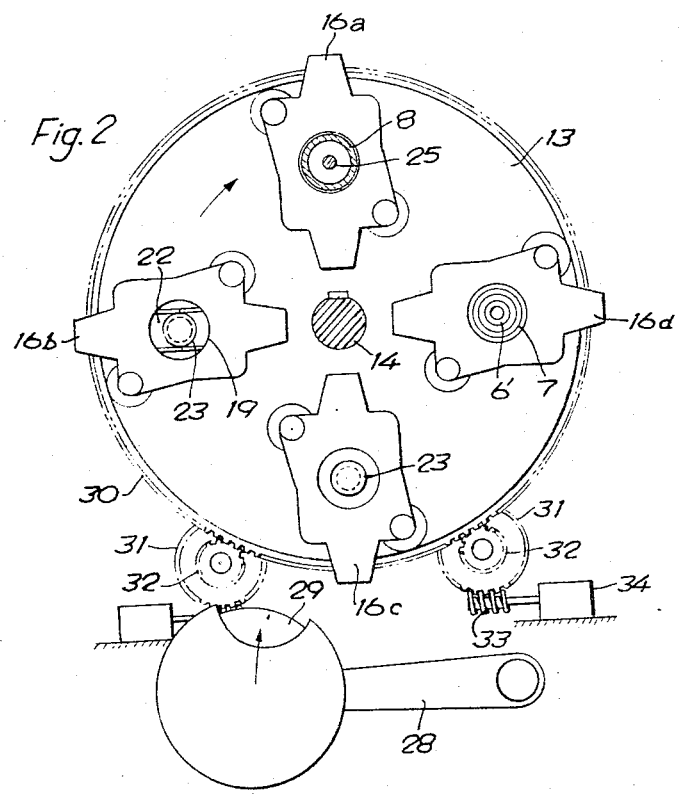

3,364,719
METAL EXTRUSION PRESS
Akira Asari, Asahi-ku, Osaka, Japan, assignor to Kobe Steel Ltd., Kobe, Japan, a corporation of Japan
Filed Aug. 16, 1965, Ser. No. 479,805
Claims priority, application Japan, Aug. 20, 1964, 39/47,587
7 Claims. (Cl. 72—255)

ABSTRACT OF THE DISCLOSURE

In a metal extruding press the operating cycle at the extrusion axis is speeded up by providing a main aperture in the load supporting frame aligned with the extrusion axis and arranging die heads to be passed longitudinally through said main aperture, to be locked therein during extrusion, to be withdrawn therethrough in assembly with the extrusion and extrusion waste and push disc after the extrusion, and to then be moved laterally with such assembly out of the extrusion axis for subsequent operations while another die head is aligned with the extrusion axis to be advanced through the main aperture and be locked therein for the next cycle of operations at the extrusion axis. The die heads comprise tubular take-out conduits and are reciprocably mounted in a movable carrier, and means are provided for retracting the extrusion and die from the die head to expose the trailing end of the extrusion for the cut-off operation which is conducted at a position out of the extrusion axis.

This invention relates to a novel method of operating a metal extruding press and to means used in said method. More particularly, it relates to the cutting of extruded materials, and other operations after extrusion such as the removal of extrusion waste and the insertion of a new die.

By an extrusion cycle is meant a period of time from the beginning of extrusion of a first billet to the beginning of extrusion of a second billet. In spite of the fact that the time required for extrusion of a billet is not very much, the press cycle is considerably long as compared therewith. This is because much time is consumed by subordinate or auxiliary procedures distinct from the extrusion.

A system is known in which two or more containers are used to be circulated for the purpose of reducing the press cycle. In order to achieve such reduced press cycle without using two or more billet containers, the present invention contemplates providing an arrangement comprising a plurality of parts for treating extrusion material or supporting die, said parts being retained by a movable disc positioned in front of an opposed frame, die heads arranged on said movable disc in plurality of areas thereof so as to achieve said retaining, said movable disc being adapted to successively move the die heads to the center of extrusion by the intermittent movement of said disc, the extrusion force being sustained by said die heads, the extrusion material after being extruded pulled together with the die heads forwardly of the opposed frame thereby moving the material together with a movable disc to the next line where the operation necessary for treating the extrusion material is effected, after which a new die is inserted on the line previous to the reaching of the extrusion center, these processes being repeated to effect extrusion.

In order to reasonably effect this operation, on each line is positioned a retainer disc having clamps carried by a rotary type movable disc, use being made of means constructed to hold extrusion waste portion when an extrusion material is cut off.

An embodiment of the present invention will now be described with reference to the accompanying drawings in which:

FIG. 1 is a cross-section of an apparatus embodying the invention, with part of a rotary disc 13 shown in expansion view; and FIG. 2 is a front view of said rotary disc.

A container 1 disposed adjacent an opposed frame 2 is retained by a container holder 3 so as to be movable in an extrusion direction and is adapted to receive an extrusion stem 4 driven by hydraulic means (not shown). The opposed frame 2 has a cylindrical opening 5 bored therethrough along the extrusion center I—I, in which opening a die head 7 adapted to have a die 6 fitted in the foremost end thereof is loosely received so as to be slidable therein to bring the die 6 into contact with the foremost end of the container 1. This die head 7 has a take-off conduit 8 forwardly extending for a long distance, and, there is provided a recess 9 in the vicinity of the die of its die head, said recess being adapted to be engagedly held by stoppers 12, 12 provided on the pistons 11, 11 of hydraulic cylinders 10, 10 arranged adjacent the opposed frame 2 so as to be at right angles with the extrusion direction. This engagedly held position is assumed when extrusion is being performed. A rotary disc 13 spaced at a suitable distance forwardly of the opposed frame 2 is rotatably mounted on a shaft 14 parallel with the extrusion direction, and is provided with cylindrical openings 15, for example, four in number, bored therethrough in parallel with the extrusion direction. The respective positions in which these four cylindrical openings 15 exist define lines I—I, II—II, III—III and IV—IV, the line I—I coinciding with the extrusion center. The rotary disc 13 is intermittently rotated around the shaft 14 by the rotation of worms 33 as shown in FIG. 2 wherein pinions 32 meshing with a rack 30 formed on the outer periphery of the rotary disc are coaxial with worm wheels 34 meshing with the worms 33 secured to the rotating shafts of driving devices 34. The rotative angle at each time is 90° when said lines I–IV are four in number. Thus, upon each intermittent rotation, all the cylindrical openings 15 will be advanced one line each. Retainer discs 16a, 16b, 16c, 16d located on the respective center lines of the cylindrical openings 15 in the rotary disc 13 are attached in such a manner that they are reciprocatedly driven in the extrusion direction by the pistons 18, 18 of hydraulic cylinders 17, 17 provided in the rotary disc 13. Therefore, the four retainer discs 16a–16d will be positioned on the respective lines I–IV. Each retainer disc is provided at its center with an opening 19 through which said die head 7 can freely pass, and is further provided on its front surface with a pair of pistons 21, 21 driven in the direction of said surface by means of hydraulic cylinders 20, 20, and clamps 22, 22 are secured to the foremost ends of said pistons. The clamps 22, 22 are for the purpose of holding a push disc 23 therebetween, which push disc, when extruding a billet, is caused to abut against the rear surface thereof to support the foremost end of the stem 4.

The apparatus explained above is operated in the following manner.

A billet 24 charged in the container 1 on the line I—I (extrusion center) in FIG. 2 is extruded through the die 6 by the stem 4 through the intermediary of the push disc 23 abutting against the rear surface of the billet, and the extrusion material 25 passes trhough the die head 27 into the take-off conduit 8. At the extrusion center the die head 7 on the line I—I is supported at both sides thereof by the stoppers 12, 12, the extrusion force being sustained by the opposed frame 2 through said stoppers. When the extrusion is completed on the line I—I, the stem 4 is retracted, whereupon the container is moved whereby the extrusion waste which has adhered closely to the inner surface of the container is separated therefrom. Thus, when the stoppers 12, 12 are outwardly moved by the pistons 11, 11 thereby releasing the recess 9 in the die head, the take-off conduit is forwardly pulled by the drive of a taking-off device 26, whereby the die head 7 followed by the extrusion material 25, die 6, extrusion waste 27 and push disc 23 sticking thereto escapes forwardly through the cylindrical opening 5 in the opposed frame. While this operation is being effected, the inner surface of the container is cleaned.

When the rotary disc is rotated through 90° after the confirmation of the leaving of the push disc from the front surface of the opposed frame, the take-off conduit 8 together with the extrusion material, etc. which has been positioned on the line I—I is moved in parallel with the line II—II, so that when the rotary motion is stopped, the pistons 21, 21 of retainer disc 16b (which is now on the line II—II) are operated causing the clamps 22, 22 to hold therebetween the push disc 23 and driving the pistons 18, 18 of the hydraulic cylinder 17 to move said retainer disc to the left, whereupon the extrusion waste 27 adhering closely to said push disc, the die 7 and the extrusion material 25 are pulled together with the push disc 23 in the same direction, and the take-off conduit 8 and die head 7 are held by the rotary disc (see the position on the line II—II shown in FIG. 1). In addition, the take-off conduit 8 is stopped at the location where the jaw of the die head 7 is engagedly held by the rotary disc 13. When this series of operations are completed, on the line I—I the next extruding operation has been completed, so that the rotary disc is further rotated through 90° after the end of various operations on said line I—I.

There is a cutting saw 29 located outwardly of the line III—III and supported on a rocking arm 28 as shown in FIG. 2. The portion between the extrusion material 25 and extrusion waste 27 is cut by the advance of said cutting saw 29, and the extrusion material 25 is outwardly taken off, so that by disengaging the clamps 22, 22, the extrusion waste 27 together with the die 6 and push disc 23 is removed (this condition corresponding to the position on the line III—III in FIG. 1). After the end of this operation, the next extrusion is completed and the rotation of the rotary disc 13 through 90° causes the die head on the line III—III to be moved together with the take-off conduit 8 onto the line IV—IV, so that a new die 6' can be inserted (this condition corresponding to the position on the line IV—IV in FIG. 1).

When the rotary disc is further rotated through 90°, the die head 8 on the line IV—IV is moved onto the line I—I with the new die 6' being inserted thereinto, so that extrusion is again performed on said line I—I, the cycle being repeated hereafter.

The most notable of the above-mentioned operations is that while extrusion is performed on the line I—I, the clamping of the push disc 23, the cutting of the extrusion material 25 and the insertion of the new die head 6' are concurrently effected respectively on the other three lines II—II, III—III and IV—IV. In this way, a reduction in extrusion cycle can be attained by performing the preparatory operations incidental to extrusion separately on other lines II–IV than the line I—I.

Particularly the invention has no possibility of incurring a danger to working, since the auxiliary operations followed by extrusion are performed forwardly of the opposed frame 2. Further, it allows easy removal of the extrusion waste. According to the invention, in order to effect these operations the rotary disc 13 is positioned in front of the opposed frame and some die heads (with take-off conduit annexed thereto) secured to the periphery thereof are adapted to be moved by turns onto some determined lines I–IV, with the result that various operations can be reasonably effected without influencing the principal portions of the press around its container. In addition, sometimes a sliding type movable disc is used instead of the above-mentioned rotary disc.

What I claim is:

1. A method of operating a metal extruding press in which a billet is extruded from a container through a die supported by a load supporting frame which has an aperture through which the extrusion passes along the extrusion axis, which method comprises:
    (a) employing a billet container having an internal cross section the projection of which along said extrusion axis falls entirely within said aperture, and a set of die heads and dies sized to pass through said aperture,
    (b) passing a first die head and die through said aperture in a direction counter to the direction of extrusion until said die reaches its extrusion-forming position, securing said first die head and die in said extrusion-forming position, and forming an extrusion passing through said first die and die head and said frame aperture,
    (c) then releasing said first die head from said extrusion-forming position and retracting the assembly comprising said first die head and die and the extrusion and extrusion waste carried thereby completely through said aperture,
    (d) then moving the retracted assembly laterally out of alignment with said extrusion axis and repeating steps (b) and (c) with a second die head and die, and
    (e) separating from said first die carrier and die at a location out of alignment with said extrusion axis, the extrusion and extrusion waste carried thereby, to ready said first die head for use in a further repetition of steps (b) and (c).

2. A metal extruding press having an extrusion axis and comprising, in combination:
    (a) a load supporting frame having a main aperture therethrough aligned with said extrusion axis,
    (b) a billet container positioned on one side of said frame to align with said extrusion axis, said billet container having an internal cross section the projection of which along said extrusion axis falls entirely within said main aperture,
    (c) a movable carrier spaced from the opposite side of said frame and having a set of apertures therein positioned to be respectively aligned with said extrusion axis by movement of said carrier,
    (d) a die head reciprocable in each aperture of said set and sized to pass through said main aperture, said die head carrying a die in position to pass through said main aperture therewith and engage with said billet container,
    (e) means for advancing said die head through said main aperture and releasable locking means for then locking said die head to said frame with said die positioned to engage said billet container,
    (f) means for forcing metal of a billet in said container through said die for forming an extrusion extending through said die, die head, and main aperture and having an extrusion waste at the end thereof engaged with said container, the formation of said extrusion by said forming means thus forming an assembly comprising said die head and the die, extrusion and extrusion waste carried thereby,
    (g) means for releasing said locking means and for retracting said assembly through said main aperture, and
    (h) means for moving said carrier to move said extracted assembly out of alignment with said extrusion axis and for aligning with said extrusion axis another die head for advancement through said main aperture.

3. A metal extrusion press according to claim 2, further comprising:
    (i) push disc means advanceable through said container and retractable with said extrusion waste through said main aperture, said push disc, extrusion waste, die and extrusion forming a sub-assembly of said assembly, (j) means located in the space between said carrier and said frame engageable with said sub-assembly for producing relative movement between said sub-assembly and the associated die head to expose the extrusion between said die and die head, and (k) means positioned for severing the so exposed portion of said extrusion after said assembly has been moved out of alignment with said extrusion axis.

4. A metal extrusion press according to claim 3, wherein said means (j) comprises, adjacent each aperture of said set of apertures, retainer means movable toward and away from the carrier (c) and means on said retainer means and on said push disc for releasably securing said push disc to said retainer means.

5. A metal extrusion press according to claim 2, wherein said die heads (d) comprise elongated tubular take-out conduits movably mounted in the apertures of said movable carrier.

6. A metal extrusion press according to claim 2, wherein said releasable locking means comprises latch means carried by said frame in juxtaposition to said main aperture and latch keeper means carried by said die head.

7. A metal extrusion press according to claim 4, wherein said means for releasably securing said push disc to said retainer means comprises latch means carried by said retainer means and keeper means carried by said push disc.

References Cited

UNITED STATES PATENTS

| 2,896,782 | 7/1959 | Billen | 72—263 |
| 3,019,894 | 2/1962 | Delcroix et al. | 72—263 |
| 3,139,183 | 6/1964 | Elkan | 72—255 |

CHARLES W. LANHAM, *Primary Examiner.*

K. C. DECKER, *Assistant Examiner.*